United States Patent [19]
Osborn et al.

[11] 3,814,507
[45] June 4, 1974

[54] ADJUSTABLE MIRROR MOUNT

[75] Inventors: Dale B. Osborn, Sunnyvale; William R. Hill, Campbell, both of Calif.

[73] Assignee: GTE Sylvania Incorporated, Mountain View, Calif.

[22] Filed: Dec. 4, 1972

[21] Appl. No.: 311,887

[52] U.S. Cl. .......................... 350/285, 331/94.5 D
[51] Int. Cl. ............................................ G02f 1/34
[58] Field of Search ............... 74/89.15; 248/180; 331/94.5; 350/285

[56] References Cited
UNITED STATES PATENTS
3,359,812   12/1967   Everitt .......................... 331/94.5
3,400,597   9/1968    Nater ............................ 331/94.5

Primary Examiner—William L. Sikes
Attorney, Agent, or Firm—John F. Lawler; Norman J. O'Malley; Elmer J. Nealon

[57] ABSTRACT

A mirror mounting plate is pivotally supported on a wall for independent movement in two perpendicular planes by two substantially identical coarse and fine adjustment mechanisms. Each adjustment mechansim comprises a coarse adjustment screw extending through the wall and mounting plate and adapted to vary the spacing therebetween when rotated. Fine or vernier adjustment is provided by pivoting one end of a lever about the screw adjacent to the plate by means of a fine adjustment screw connected between the other end of the lever and the wall. Springs between the wall and mounting plate provide resilient support for the latter and an O-ring compressed between the wall and mirror seats the latter tightly within the mounting plate.

6 Claims, 8 Drawing Figures

ADJUSTABLE MIRROR MOUNT

BACKGROUND OF THE INVENTION

This invention relates to mirror mounts and more particularly to an adjustable mirror mount for use with a laser or the like.

The need for low cost portable lasers has increased considerably with the ever increasing numbers of applications for the equipment. While discovery of new materials and techniques has enabled laser manufacturers to achieve considerable success in developing and producing commercial grade lasers, there has been difficulty in achieving precise optical alignment of laser mirrors by unskilled or semi-skilled technicians in operating the equipment.

An object of this invention is the provision of a simple low cost adjustable mirror mount for portable lasers.

A more specific object is the provision of a mirror mount with means for making coarse and fine adjustments of optical alignment.

Another object is the provision of a laser mirror adjustment assembly made of standard parts and which permits adjustment resolution equivalent to 200 threads per inch.

SUMMARY OF THE INVENTION

The invention comprises three point support for a mirror mounting plate, two of the supports being adjusted for coarse pivoting of the plate about the third or pivot connection. Fine adjustment of the plate at each of the coarse adjustment connections is achieved by a simple lever which pivots or rocks about the support at the plate by a displacement of the remote end of the lever.

DESCRIPTION OF PREFERRED EMBODIMENTS

Figure 1:
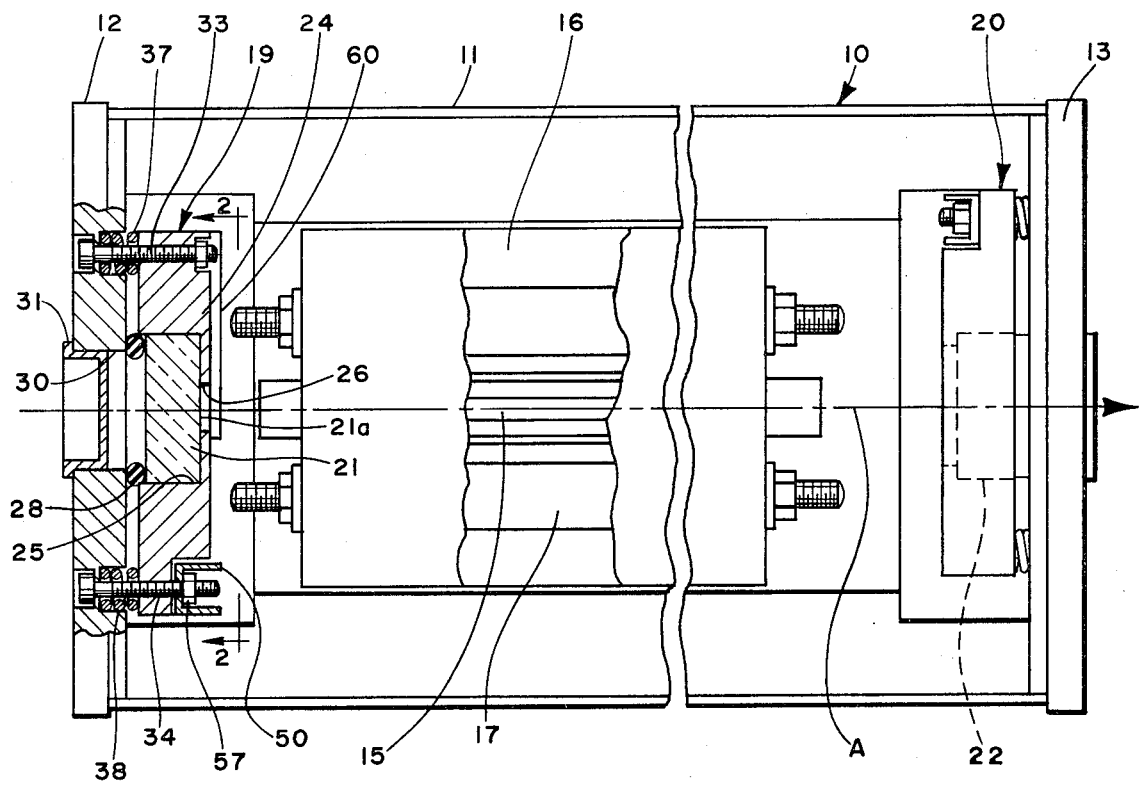
FIG. 1 is a fragmentary plan view of laser apparatus with mirror mount assemblies embodying the invention, a portion of the central part of the apparatus being broken away to show construction details, one of the mirror mounts being viewed along the line 1—1 of FIG. 2.
Figure 2:
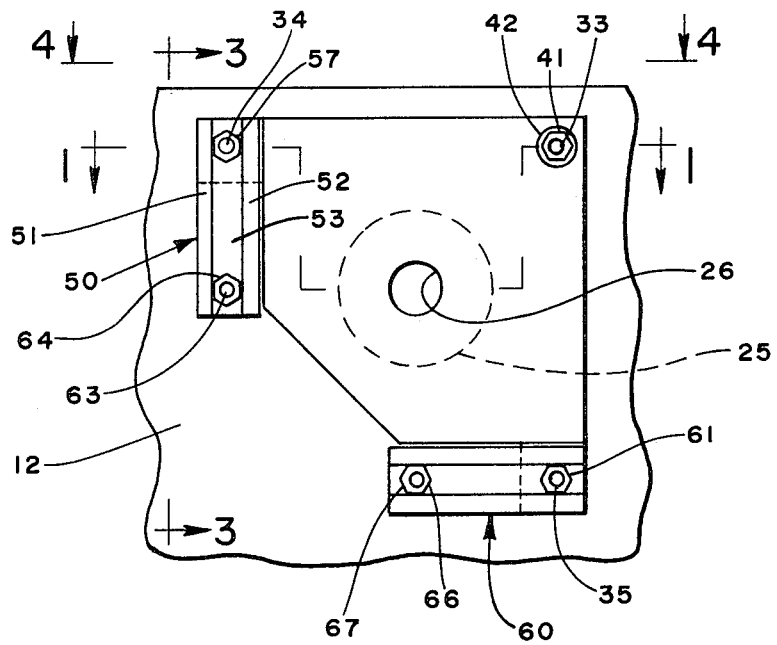
FIG. 2 is an axial inner end view of the mirror mount assembly taken on line 2—2 of FIG. 1.

Referring now to the drawings, FIG. 1 illustrates laser apparatus 10 having a housing 11 with end walls 12 and 13, a lasing medium 15 supported between the end walls, and a pair of lamps 16 and 17 supported adjacent to the lasing medium for optically energizing or "pumping" it to produce a beam of coherent light. The lasing medium may comprise a rod of solid material such as yttrium aluminum garnet (YAG) doped with neodymium (Nd) disposed along the axis A of the laser so as to produce a beam of coherent light along that axis when energized by lamps 16 and 17 in the well-known manner. Supported adjacent to and on the inside of end walls 12 and 13 are mirror mount assemblies 19 and 20 which support mirrors 21 and 22, respectively, for defining the laser cavity and recirculating the beam of coherent light within rod 15. Mirror 21 is a totally reflecting mirror whereas mirror 22 is a partially reflecting mirror which transmits part of the internally generated coherent beam as the output from the laser as indicated by the arrow.

Mirror mount assemblies 19 and 20 are essentially identical in construction and therefore the following description will be directed to one of them, namely, assembly 19, it being understood that both assemblies are adjusted in substantially the same manner to insure that the beam of light reflected from the mirrors is on the axis A of the laser for optimum laser performance.

Assembly 19 comprises a mirror mounting plate 24 having a recess 25 facing end wall 12 and in which mirror 21 is received and seated. The reflecting surface 21a of the mirror is exposed to the laser beam through a central opening 26 in plate 24. An O-ring 28 compressed between mirror 21, mounting plate 24 and inner surface of end wall 12 insures that the mirror is tightly seated in the mounting plate recess and that the mounting plate is resiliently spaced inwardly from the end wall.

End walls 12 and 13 are identical in construction for simplicity and low cost in manufacturing the laser apparatus and therefore end wall 12 has a central aperture 30 through which the output laser beam passes when the end wall is used adjacent the output mirror. Since mirror 21 adjacent end wall 12 is a totally reflecting mirror, aperture 30 therein is closed by a cup 31. Such cup is omitted in end wall 13.

Plate 24 is supported on end wall 12 by adjustable connectors or screws 33, 34 and 35 at opposite corners of the plate. Springs 37, 38 and 39 disposed coaxially of screws 33, 34 and 35, respectively, between end wall 12 and plate 24 urge the latter inwardly from the end wall and provide a resilient adjustable mount for the mirror. Pivot screw 33 extends through opening 40 in plate 24 and engages a nut 41 non-rotatably held in a tightly fitting recess 42 on the opposite side of plate 24 to permit the pivot screw to be rotated from the outside or exposed side of the end wall. The spacing between end wall 12 and plate 24 is approximately three-thirty-seconds inch and is sufficient to maintain a slight compression on O-ring 28.

Figure 5:
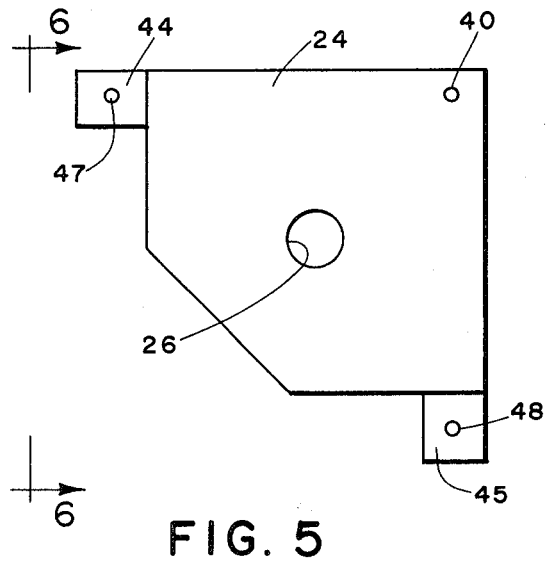
FIG. 5 is a plan view of the mirror mounting plate.
Figure 6:
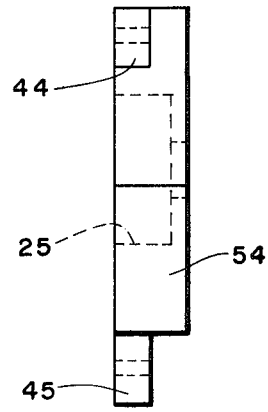
FIG. 6 is an end view of the mirror mounting plate taken on line 6—6 of FIG. 5.
Figure 7:
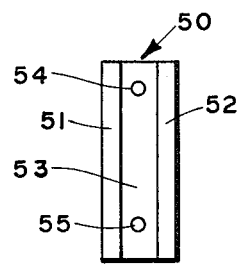
FIG. 7 is a plan view of one of the adjustment levers.

Plate 24 is a generally rectangular plane sheet and has tabs or rectangular ears 44 and 45 at the plate corners nearest to pivot opening 40, see FIGS. 5 and 6. Tabs 44 and 45 are flush with the front surface of the plate, have a thickness about half of that of the main body of the plate, and are formed with openings 47 and 48 through which adjustment screws 34 and 35, respectively, extend. An inwardly opening channel-shaped elongated lever 50 has one end overlapping the inner or back surface of tab 44 and extends from the tab along the adjacent side edge of the plate. Lever 50, see FIG. 7, has side walls 51 and 52 adjoining bottom wall 53 which has openings 54 and 55 formed therein near its opposite ends. Lever 50 is positioned with opening 54 in alignment with tab opening 47 and coarse adjust screw 34 extends through these aligned openings for threaded engagement with a nut 57 non-rotatably held between lever side walls 51 and 52.

Lever 60 is substantially identical to lever 50 and is secured in overlapping engagement with the inner or back surface of tab 45 by coarse adjust screw 35 which engages nut 61 nonrotatably held within the channel recess of the lever. Lever 60 extends along the side edge of plate 24 preferably in a direction perpendicular to the long dimension of lever 50.

In order to rock or pivot lever 50 about coarse screw 34, a fine adjust screw 63 extends through end wall 12 and lever opening 55 for engagement with nut 64 non-rotatably held within the channel of lever 50. The force exerted by spring 38 and O-ring 28 against plate 24 forces lever 5 against nut 64 so that rotation of fine adjust screw 63 varies the spacing of the adjacent end of lever 50 from end wall 12 to effectively rock or pivot the lever about coarse adjust screw 34.

In similar manner, fine adjust screw 66 extends through end wall 12 and lever 60 for engagement with non-rotatably held nut 67 to provide pivotal movement of the lever about coarse adjust screw 35 in a plane perpendicular to the pivot plane of lever 50.

Figure 3:
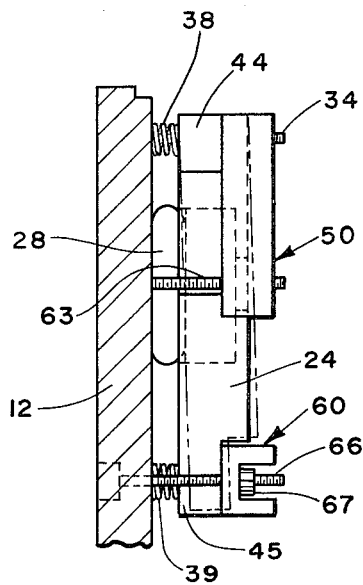
FIG. 3 is a section taken on line 3—3 of FIG. 2.
Figure 4:
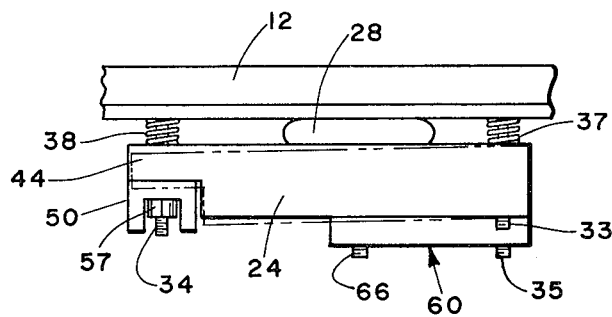
FIG. 4 is a top plan view of the assembly taken on line 4—4 of FIG. 2.

The mirror mounting assembly described above is readily adjustable by an operator in the field to provide proper optical alignment by adjustment of coarse screws 34 and 35 and fine adjust screws 63 and 66 which are readily accessible from the front side of end plate 12. Rotation of coarse screw 33 causes plate 24 to be rocked or pivoted about pivot screw 33 in a first adjustment plane as indicated in broken lines in FIG. 4. Similarly, rotation of the other coarse screw 35 causes plate 24 to pivot about pivot screw 33 in a second pivot plane perpendicular to the first plane as indicated in broken lines in FIG. 3. While such coarse mirror plate adjustments may be made in the field, in practice they are made at the factory and field adjustments are limited to operation of the fine adjust screws 63 and 66.

Figure 8:
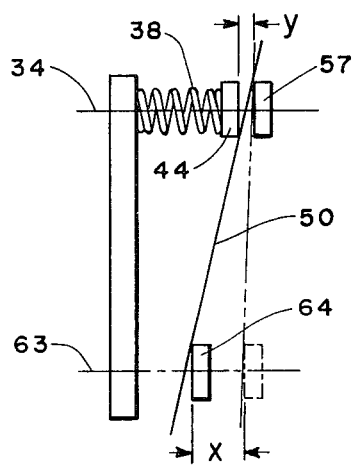
FIG. 8 is a schematic view showing the underlying principle of the fine adjustment of the mounting plate in accordance with the invention.

The operation of the fine adjust screw is shown more clearly in the schematic diagram of FIG. 8. The solid line position of lever 50 is dictated by the axial position of nut 64 on screw 63 and the fixed position of coarse nut 57 on screw 34. With the lever 50 disposed as shown, the position of plate 24 at tab 44 is determined by abutment of the tab against the lever adjacent to screw 34 which is essentially the fulcrum of the lever. As the fine adjust nut is displaced a distance X to the broken line position at the right as shown upon turning of the fine adjust screw, lever 50 pivots about the coarse screw to the broken line position and permits the springs to displace tab 44 in the same direction by a smaller distance Y. Similarly, when screw is rotated in the opposite direction, tab 44 (and with it plate 24) is displaced to the left as viewed. The ratio of the displacements X and Y is a function of the mechanical advantage provided by lever 50 which greatly simplifies the fine adjustment of the mirror for final optical alignment of the instrument. By way of example, in one embodiment of the invention, one rotation of a standard coarse screw 34 having 40 threads per inch displaced plate 24 by 0.025 inch; with a lever having an effective length of one inch (between holes), one rotation of a standard screw 63 having 40 threads per inch caused plate 24 to be displaced 0.005 inch.

Adjustment of the output coupling mirror adjacent end wall 13 is achieved in the same manner as described above. Final positioning of the mirrors is determined by observation of the output power or mode pattern with a suitable measuring instrument.

While the adjustable mirror mount described above is particularly useful as part of a portable laser system, it will be understood that the invention may be practiced with advantage in other equipment and apparatus in which precise positional adjustments of a plate or the like are required or desired.

What is claimed is:

1. An assembly for adjustably mounting an element on a fixed member comprising
    a mounting plate disposed in juxtaposition with said member,
    first, second and third connector means interconnecting said plate and said member at three separated locations, respectively,
    means for resiliently spacing said plate from said member,
    said first and second connector means being adjustable at said member for changing the spacing between the plate and member at the first and second locations, respectively, whereby to pivot said plate about the third connector means,
    each of said first and second connector means having a rigid lever, said lever engaging said plate adjacent the associated connector means and being pivotable about said connector means for incrementally varying the spacing between said plate and said member at the particular location of the connector means, and adjustable spacer means interconnecting said member and said lever remote from the associated connector means for inducing said pivotal movement of the lever.

2. The assembly according to claim 1 in which said first and second connector means comprise screws, said resilient spacing means comprising springs coaxially disposed over said screws and between said plate and said member.

3. The assembly according to claim 2 in which a portion of each screw projects from said lever, a nut threadedly engaging said portion of the screw, each of said levers being channel-shaped and having side walls adapted to engage the nut to prevent rotation thereof.

4. Mechanism providing coarse and fine positional adjustment of the reflecting plane of an optical element relative to an incident fixed-axis light beam for varying the angle of incidence of the beam on the element comprising
    a plate for holding said element,
    a fixed wall member, and
    means for supporting said plate in juxtaposition on said member comprising
    a pivot pin pivotally supporting said plate on said wall member,
    first and second spacer means extending through said member and operatively engaging said plate at separated locations spaced from said pivot pin, and
    means for resiliently urging said plate away from said member,
    said first and second spacer means being adjustable to cause said plate to pivot about said pin in separate planes intersecting at the pin whereby to provide a coarse positional adjustment of the element, first and second rigid levers pivotally connected to said first and second spacer means, respectively, at said plate whereby to move said plate as the levers pivot, and first and second lever actuators extending through said wall member and operatively engaging said first and second levers, respectively, remote from their respective pivots whereby to provide a fine positional adjustment of the optical element.

5. Mechanism according to claim 4 in which said plate has a pair of tabs projecting from the edges remote from said pivot pin, said first and second spacer means operatively engaging said tabs, respectively, for pivoting said plate about said pin, said levers being pivotally connected to said tabs, respectively, for movement transversely of the plane of the plate.

6. In a laser having a housing with a pair of end walls, a lasing medium within said housing, means for energizing said lasing medium to produce a beam of coherent light, and a pair of mirrors on opposite sides of said lasing medium for recirculating said beam within said medium, the improvement of means for adjustably mounting each of said mirrors on said housing comprising a plane plate adjacent the end wall and having one face formed with a central recess and an opening extending between the opposite face and the recess, said mirror being seated in said recess with its reflecting surface extending generally in the plane of the plate, said plate being supported on said end wall for pivotal movement in directions transversely of the plane of the plate, first and second connector means connecting said plate to said end wall remote from the pivotal support, each of said connector means being adjustable to vary the spacing between the plate and end wall whereby to provide a coarse adjustment of the position of the mirror, first and second rigid levers pivotally connected to said first and second connector means, respectively, adjacent to the plate, and means for pivoting each of said levers about the respective connector means for incrementally varying the spacing of said plate and end wall whereby to pivot said plate relative to the end wall and to thereby provide a fine adjustment of the position of the plane of the mirror.

* * * * *